United States Patent [19]

Mort et al.

[11] Patent Number: 5,114,477

[45] Date of Patent: May 19, 1992

[54] LIQUID INK COMPOSITIONS

[75] Inventors: Joseph Mort; Mary A. Machonkin, both of Webster, N.Y.

[73] Assignee: Xerox Corporation, Stamford, Conn.

[21] Appl. No.: 754,084

[22] Filed: Sep. 3, 1991

[51] Int. Cl.$^5$ .............................................. C09D 11/02
[52] U.S. Cl. ..................................... 106/20; 106/472; 106/476
[58] Field of Search ........................... 106/20, 472, 476

[56] References Cited

U.S. PATENT DOCUMENTS 4,184,881  1/1980  Bradley .................................. 106/20
4,601,777  7/1986  Hawkins et al. ..................... 156/626

OTHER PUBLICATIONS

Time Magazine, "Great Balls of Carbon", J. M. Nash, May 6, 1991, p. 66.
Science, "Buckyballs, Hairyballs, Dopeyballs"; vol. 252, Apr. 12, 1991, p. 646.
Nature, "Solid $C_{60}$: a New Form of Carbon", W. Krätschmer et al., vol. 347, Sep. 27, 1990, pp. 354 to 358.
Chemical & Engineering News, "Simple Synthesis of $C_{60}$ Molecule Triggers Intense Research Effort", R. M. Baum, Oct. 29, 1990, pp. 22 to 25.
"Photo Conductivity in Solid Films of $C_{60/70}$", J. Mort et al., Submitted to Nature Referees Jul. 24, 1991.

Primary Examiner—William R. Dixon, Jr.
Assistant Examiner—Helene Klemanski
Attorney, Agent, or Firm—E. O. Palazzo

[57] ABSTRACT

An ink composition which comprises an aqueous or organic liquid vehicle, and as a colorant a fullerene, or a mixture of fullerenes.

21 Claims, No Drawings

LIQUID INK COMPOSITIONS

BACKGROUND OF THE INVENTION

This invention is generally directed to ink compositions, and more specifically the present invention is directed to ink jet inks, such as liquid thermal ink jet compositions. In one embodiment of the present invention, the imaging inks contain as a component any one of the fullerenes, such as buckminsterfullerene, giant fullerenes or mixtures thereof. The aforementioned fullerenes can be selected as the pigment or colorant for the ink, or, for example, as surface additives for other pigments to modify, control and improve their hydrophobic and hydrophilic properties and their adhesion to marking media such as paper or transparencies. Examples of ink jet printing processes, including thermal ink jet, and wherein the inks of the present invention may be selected, are illustrated in U.S. Pat. Nos. 4,601,777; 4,251,824; 4,410,899; 4,412,224; and 4,532,530, the disclosures of which are totally incorporated herein by reference.

Ink jet printing systems can be classified as continuous stream and drop-on-demand. In continuous ink jet systems, ink is emitted in a continuous stream under pressure through at least one orifice or nozzle. The stream is perturbed causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability. The inks of the present invention can be selected for the aforementioned systems, especially the thermal ink jet systems in embodiments thereof.

The operating sequence of the bubble jet system is initiated with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Known ink jet inks generally comprise a water soluble dye which is soluble in an ink vehicle such as water or a mixture comprising water and a water soluble or water miscible organic solvent. For example, U.S. Pat. No. 4,184,881 discloses an ink composition for use in ink jet printing comprising an aqueous solution of a water soluble dye and a humectant comprised of ethylene oxide adducts of at least one acetylenic diol in the absence of any glycol or glycol ether. In addition, U.S. Pat. No. 4,337,183 discloses an aqueous printing ink composition which comprises a physical mixture of polyurethane resin, polyethylene resin, and water as the vehicle. Further, U.S. Pat. No. 3,477,862 discloses an ink comprising a dyestuff, a solution of high molecular weight polyethylene oxide and glycerin for employment in a pen, nozzle or other ink applying means to ensure the inscription of a clear continuous solid line on a chart on which the ink applying means is associated as the ink applying means traverses the chart. The disclosures of each of the patents mentioned herein are totally incorporated herein by reference.

Heterophase ink jet inks are also known. For example, U.S. Pat. No. 4,014,833 (Story) discloses a composition and method for improving the ink transfer properties of aqueous printing inks. The composition is an aqueous ink containing from 0.1 to 1.5 percent by weight of a polyethylene oxide resin having a molecular weight in the range of from 100,000 to 350,000. In addition, U.S. Pat. No. 4,680,332 discloses a heterophase ink composition which comprises a water insoluble polymer dispersed in a liquid medium, the polymer containing therein an oil soluble dye, and a nonionic stabilizer permanently attached thereto. The polymer may include styrene, parachlorostyrene, vinyl naphthalene, and acrylates wherein the carbon chain length is from about 1 to about 18 carbon atoms. The stabilizers may include ethylene oxide and propylene oxide block copolymers. Further, U.S. Pat. No. 4,705,567 discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion constitutes a polymer of monomers having mainly polymerizable vinyl groups into which hydrophilic portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes. The disclosures of each of the patents mentioned herein are totally incorporated herein by reference.

Molecular fullerenes have been described as entirely closed, hollow spheroidal shells of carbon atoms containing 32 to 1,000 or more carbon atoms in each sphere, reference Smalley, R. E. "Supersonic Carbon Cluster Beams in Atomic and Molecular Clusters", Bernstein, E. R., Ed.; Physical and Theoretical Chemistry, Vol. 68, Elsevier Science: New York, 1990; pages 1 to 68, the disclosure of which is totally incorporated herein by reference. The prototypical fullerene, $C_{60}$, has been referred to as buckminsterfullerene and has the molecular geometry of a truncated icosahedron, thus the $C_{60}$ molecules resemble a molecular sized soccer ball, reference Time Magazine, May 6, 1991, page 66, and Science, vol. 252, Apr. 12, 1991, page 646, the disclosure of which is totally incorporated herein by reference. Molecules of $C_{60}$ as well as of $C_{70}$ and of other fullerenes have also been referred to as buckyballs. Buckminsterfullerenes are usually comprised of $C_{60}$ molecules contaminated with small amounts of $C_{70}$ and possibly $C_{84}$ molecules or even smaller amounts of higher molecular weight fullerene molecules. The preparation of buckminsterfullerene and of other fullerenes from the contact arc vaporization of graphite and a number of the buckminsterfullerene characteristics such as solubility, crystallinity, color and the like have been described in Kratschmer, W., Lamb, L. D., Fostiropoulos, K., Huffman, D. R., Nature, 1990, Vol. 347, pages 354 to 358, and in Chemical and Engineering News, Oct. 29, 1990, pages 22 to 25, the disclosures of which are totally incorporated herein by reference. The fullerenes are available from Texas Fullerenes Corporation, 2415 Shakespeare Suite 5, Houston, Tex. 77030-1038, Materials & Electrochemical Research (MER) Corporation, 7960 South Kolb Road, Tucson, Ariz. 85706, and Research Materials, Inc., 1667 Cole Boulevard, Golden, Colo. 80401, and are believed to be comprised of mainly $C_{60}$ and smaller amounts of $C_{70}$ and $C_{84}$ carbon molecules, and possibly small amounts of other higher molecular weight fullerenes. Allotropic forms of carbon comprised of spherical assemblies of carbon atoms $C_n$ with, for example, n being the number 60, 70, 84, and the like are considered fullerenes and can be formed as powders by the evaporation of graphite in inert noble gas atmospheres with arcs or lasers, and these fullerenes are available from the sources mentioned herein. The color of the allotrope can depend on the value of n, for example when n is equal to 70 the color is orange, when n is equal to 60 the color is purple magenta, and when n is equal to 62 the color is yellow. It is believed that these new forms of carbon possess a number of advantages for liquid thermal ink jet applications, including, for example, their solubility in organic solvents and, with appropriate chemical modification, such as the attachment of diamine chromophores to the surface of the carbon shell, solubility in water. The other known carbon forms, diamond and graphite and derivatives thereof, are not considered to be soluble in such solvents. Potential advantages of $C_{60}$ and the like as pigments over other ink jet pigments include their unusual stability against chemical and physical degradation, together with the unique opportunities they offer for the tailoring of enabling properties such as color hue and density and hydrophilic and hydrophobic character through chemical modification, internal and external of their carbon shell.

Illustrated in copending patent application U.S. Ser. No. 709,734, the disclosure of which is totally incorporated herein by reference, are developer compositions and toner compositions comprised of resin particles, and pigment particles comprised of fullerenes, a new third form of carbon also referred to as buckminsterfullerene or buckyballs, other forms of fullerenes illustrated therein, and other known fullerenes. More specifically, the copending patent application discloses toner compositions comprised of resin particles, and pigment particles comprised of fullerenes, a third form of carbon described as being comprised of 60 atom clusters of carbon arranged at the verticies of a truncated icosahedron and resembling miniature soccer balls. Such a structure resembles the geodesic domes designed by R. Buckminister Fuller, Jr., the namesake of these molecular structures. In one embodiment of the copending application, there are provided toner compositions comprised of resin particles, pigment particles, and fullerenes as charge additives. Also, in another embodiment of the copending application there are provided colored toner compositions comprised of known toner resin particles, fullerene pigment particles, and pigment particles comprised of cyan, magenta, yellow, red, green, blue, brown, or mixtures thereof.

Reference to fullerenes includes all forms of the fullerenes illustrated herein, other known fullerenes, mixtures thereof in embodiments, and the like.

SUMMARY OF THE INVENTION

It is an object of the present invention to provide ink compositions.

It is another object of the present invention to provide ink compositions suitable for use in ink jet printers.

It is yet another object of the present invention to provide ink compositions that when used in ink jet printing processes result in uniform drop size over varying drop frequencies.

It is still another object of the present invention to provide ink compositions that when used in ink jet printing processes result in uniform drop speed over varying frequencies.

Another object of the present invention is to provide ink compositions that when used in ink jet printing processes result in relatively large drop sizes.

Yet another object of the present invention is to provide ink compositions that when used in ink jet printing processes result in few or no detectable missing drops.

Still another object of the present invention is to provide ink compositons that when used in ink jet printing processes result in minimal nozzle plugging.

It is another object of the present invention to provide ink compositions with the above advantages accompanied by acceptable latency, surface tension, and viscosity values.

It is yet another object of the present invention to provide ink jet printing processes with the inks exhibiting many of the advantages illustrated.

It is still another object of the present invention to provide thermal ink jet printing processes.

Another object of the present invention is to provide ink compositions that exhibit short drop transit times and enable good drop directionality when selected for thermal ink jet printing processes.

Yet another object of the present invention is to provide ink compositions that result in reduced or eliminated jitter when used in thermal ink jet printing processes.

These and other objects of the present invention can be achieved in embodiments thereof by providing an ink composition which comprises a vehicle, such as an organic vehicle like toluene or an aqueous liquid, and a fullerene colorant. Another embodiment of the present invention is directed to a process which comprises incorporating into an ink jet printing apparatus an ink which comprises a liquid, such as an aqueous vehicle, and a fullerene colorant. In one embodiment, the printing apparatus employs a thermal ink jet process, wherein the droplets of ink are caused to be ejected by heating the ink and causing bubbles to form therein.

Embodiments of the present invention include an ink composition which comprises an aqueous or organic liquid vehicle, and as a colorant a fullerene, or a mixture of fullerenes; an ink composition comprised of aqueous liquid vehicle, and dispersed therein as a colorant a fullerene; and an ink composition containing a fullerene or a mixture of fullerenes.

The vehicle of the inks of the present invention may be comprised of water, or may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellusolve, ether derivatives, amino alcohols, ketones, N-methylpyrrolidinone, cyclohexylpyrrolidone, hydroxyethers, amides, sulfoxides, lactones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside this range. The nonwater component of the liquid vehicle generally serves as a humectant which has a boiling point higher than that of water (100° C.). In embodiments, inks of the present invention can be comprised of a liquid vehicle like water and additives, such as a humectant, and wherein the water is generally present in an amount of from about 60 to about 99.5 percent by weight, and preferably from about 75 to about 99 percent by weight.

The inks of the present invention in embodiments contain a fullerene colorant in an effective amount of, for example, from between about 1 to about 20 percent by weight, and preferably from about 2 to about 10 percent by weight Examples of fullerenes are illustrated herein, and for example in The Journal of Organic Chemistry, 1990, Volume 55, pages 6250 to 6252, the disclosure of this article being totally incorporated herein by reference. Furthermore, inks with fullerenes that contain noncarbon atoms in the cage are envisioned. These fullerenes can be derived from an all carbon fullerene wherein, one, two, three, four, or more carbon atoms comprising the framework are replaced with known noncarbon atoms, such as boron. Also, inks comprised of fullerenes with an atom or atoms, other than carbon inside the cage, such as any atom or atoms of the known Periodic Table, the disclosure of which is totally incorporated herein by reference, such as calcium, sodium, potassium, silicon, copper, selenium, lanthanum, chlorine, iron, and the like can be trapped inside the spheroidal cluster of carbon atoms. More specifically, fullerenes or a fullerene with a molecular weight of from about 384 to about 12,000 can be selected for the inks of the present invention.

Specifically, the fullerenes, a third form of carbon, have been described as being comprised of 60 atom clusters of carbon arranged at the verticles of a truncated icosahedron and resembling miniature soccer balls. Such a structure resembles the geodesic domes designed by R. Buckminister Fuller, Jr., the namesake of these molecular structures. Reference to fullerenes includes all forms of the fullerenes illustrated herein, other known fullerenes, mixtures thereof in embodiments, and the like.

Pigments together with the fullerenes can also be selected for the inks of the present invention. The pigment can be black, cyan, magenta, yellow, red, blue, green, brown, mixtures thereof, and the like. Examples of suitable black pigments includes various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI DISPERSED RED 15 TM, a diazo dye identified in the Color Index as CI 26050, CI SOLVENT RED 19 TM, and the like. Illustrative examples of suitable cyan pigments include copper tetra-4-(octadecyl sulfonamido) phthalocyanine, X-copper phthalocyanine pigment, listed in the Color Index as CI 74160, CI PIGMENT BLUE TM, and Anthradanthrene Blue, identified in the Color Index as CI 69810, SPECIAL BLUE X-2137 TM, and the like. Illustrative examples of yellow pigments that can be selected include diarylide yellow 3,3-dichlorobenzidene acetoacetanilides, a monoazo pigment identified in the Color Index as Cl 12700, Cl SOLVENT YELLOW 16 TM, a nitrophenyl amine sulfonamide identified in the Color Index as Foron Yellow SE/GLN, Cl DISPERSED YELLOW 33 TM, 2,5-dimethoxy-4-sulfonanilide phenylazo-4'-chloro-2,5-dimethoxy acetoacetanilide, Permanent Yellow FGL, and the like. Additional examples of pigments include NORMANDY MAGENTA RD-2400 TM (Paul Uhlich), PALIOGEN VIOLET 5100 TM (BASF), PALIOGEN VIOLET 5890 TM (BASF), PERMANENT VIOLET VT2645 TM (Paul Uhlich), HELIOGEN GREEN L8730 TM (BASF), ARGYLE GREEN XP-111-S TM (Paul Uhlich), BRILLIANT GREEN TONER GR 0991 TM (Paul Uhlich), HELIOGEN BLUE L6900 TM, L7020 TM (BASF), HELIOGEN BLUE D6840 TM, D7080 TM (BASF), SUDAN BLUE OS TM (BASF), PV FAST BLUE B2G01 TM (American Hoechst), IRGALITE BLUE BCA TM (Ciba-Geigy), PALIOGEN BLUE 6470 TM (BASF), SUDAN III TM (Matheson, Coleman, Bell), SUDAN II TM (Matheson, Coleman, Bell), SUDAN IV TM (Matheson, Coleman, Bell), SUDAN ORANGE G TM (Aldrich), SUDAN ORANGE 220 TM (BASF), PALIOGEN ORANGE 3040 TM (BASF), ORTHO ORANGE OR 2673 TM (Paul Uhlich), PALIOGEN YELLOW 152 TM, 1560 TM (BASF), LITHOL FAST YELLOW 0991K TM (BASF), PALIOTOL YELLOW 1840 TM (BASF), NOVOPERM YELLOW FG1 TM (Hoechst), PERMANENT YELLOW YE 0305 TM (Paul Uhlich), LUMOGEN YELLOW D0790 TM (BASF), SUCO-GELB L1250 TM (BASF), SUCO-YELLOW D1355 TM (BASF), HOSTAPERM PINK TM E (American Hoechst), FANAL PINK D4830 TM (BASF), CINQUASIA MAGENTA TM (DuPont), LITHOL SCARLET D3700 TM (BASF), TOLUIDINE RED TM (Aldrich), SCARLET FOR THERMOPLAST NSD PS PA TM (Ugine Kuhlmann of Canada), E.D. TOLUIDINE RED TM (Aldrich), LITHOL RUBINE TONER TM (Paul Uhlich), LITHOL SCARLET 4440 TM (BASF), BON RED C TM (Dominion Color Company), ROYAL BRILLIANT RED RED-8192 TM (Paul Uhlich), ORACET PINK RF TM (Ciba-Geigy), PALIOGEN RED 3871K TM (BASF), PALIOGEN RED 3340 TM (BASF), and LITHOL FAST SCARLET L4300 TM (BASF). Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 0.1 micron. The pigment is present in the ink composition in any effective amount, generally from about 1 to about 7 percent by weight and preferably from about 2 to about 5 percent by weight.

Other additives can also be present in the inks of the present invention. For example, one or more surfactants or wetting agents can be added to the ink. These additives may be of the cationic, anionic, or nonionic types. Suitable surfactants and wetting agents include sodium lauryl sulfate, TAMOL® SN, TAMOL® LG, those of the TRITON® series available from Rohm and Haas Company, those of the MARASPERSE® series, those of the IGEPAL® series available from GAF Company, those of the TERGITOL® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks of the present invention to enhance the viscosity of the ink and the stability of the pigment particles and to reduce the rate of agglomeration and precipitation of the particles. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like are particularly useful for stabilizing pigment particles in a water based liquid vehicle such as water or a mixture of water and a water miscible organic liquid. Polymeric stabilizers may be present in the ink of the present invention in amounts of from 0 to about 10 percent by weight, and preferably from about 0.01 to about 5 percent by weight, although the amount can be outside of this range.

Other optional additives to the inks of the present invention include biocides, such as DOWICIL 150®, 200®, and 75®, benzoate salts, sorbate salts, and the like, present in an amount of from about 0.0001 to about 4 percent by weight, and preferably from about 0.01 to about 2.0 percent by weight; pH controlling agents such as acids or bases, phosphate salts, carboxylate salts, sulfite salts, amine salts, and the like, present in an amount of from 0 to about 1 percent by weight and preferably from about 0.01 to about 1 percent by weight, or the like. Optional ink additives are illustrated in copending patent application U.S. Ser. No. 722,441, the disclosure of which is totally incorporated herein by reference.

The ink compositions of the present invention are generally of a viscosity suitable for use in thermal ink jet printing processes. Typically, the ink viscosity is no more than about 5 centipoise, and preferably is from about 1 to about 2.5 centipoise in embodiments of the present invention.

The ink compositions of the present invention can be prepared by a number of suitable known processes. Typically, the inks are prepared by simple mixing of the ingredients. One process entails mixing all of the ink ingredients together and filtering the mixture to obtain an ink. The ilnks of the present invention can be prepared by known ink processes, such as by mixing the ingredients, heating if desired, and filtering, followed by adding the ink additives to the mixture and mixing at room temperature with moderate shaking until a homogeneous mixture is obtained, typically from about 5 to about 10 minutes. Alternatively, the ink additives of the present invention can be mixed with the other ink ingredients including the fullerene during the ink preparation process, which takes place according to any desired procedure, such as by mixing all the ingredients, heating if desired, and filtering.

The present invention is also directed to a process which entails incorporating the ink composition illustrated herein into an ink jet printing apparatus and causing droplets of the ink composition to be ejected in an imagewise pattern onto a substrate. In one embodiment, the printing apparatus employs a thermal ink jet process wherein the ink in the nozzles is selectively heated in an imagewise pattern thereby causing droplets of the ink to be ejected in imagewise pattern. Any suitable substrate can be employed, including plain papers such as XEROX® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a one embodiment, the process entails printing onto a porous or ink absorbent substrate, such as plain paper.

From about to about as used herein includes from between about to between about. Also, the fullerenes of the present invention can be selected as dyes for liquid inks such as those illustrated in U.S. Pat. No. 5,017,644, the disclosure of which is totally incorporated herein by reference.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition comprising 2.5 percent by weight of the fullerene (obtainable, for example, from Texas Fullerenes Corporation, 2415 Shakespeare Suite 5, Houston, Tex. 77030-1038, and believed to be comprised of mainly $C_{60}$ and smaller amounts of $C_{70}$ and $C_{84}$ carbon molecules, and possibly small amounts of other higher molecular weight fullerenes), 15 percent by weight of cyclohexyl pyrrolidone (obtained from GAF Corporation, Wayne, NJ), 1 percent by weight of sodium lauryl sulfate (obtained from Fisher Scientific, Fair Lawn, NJ), and 81.5 percent by weight of toluene is prepared by mixing together the ingredients at room temperature, 25° C., stirring to obtain a homogeneous solution, and filtering. The ink prepared can be incorporated into a thermal ink jet test fixture. It is believed that images of excellent resolution with no substantial background deposits can be obtained.

Two additional inks can also prepared, said inks being of the same composition as above except that one contained 0.1 percent by weight of CARBOWAX M20 TM (a polyethylene oxide/bisphenol-A polymer of the formula

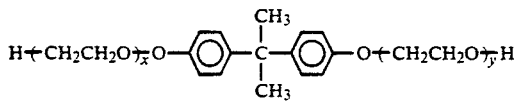

with a molecular weight of 18,000 (obtained from Union Carbide Corporation, Danbury, CT), and 2.4 percent by weight of the fullerene, and the second ink contained 0.3 percent by weight of CARBOWAX M20 TM and 2.2 percent by weight of the fullerene. The CARBOWAX M20 TM is added to the ink at room temperature and the resulting mixture is stirred for about 5 minutes to obtain a homogeneous solution.

EXAMPLE II

Water soluble fullerenes are prepared by placing 1 gram of the fullerenes (obtainable, for example, from Texas Fullerenes Corporation, 2415 Shakespeare Suite 5, Houston, Tex. 77030-1038, and believed to be comprised of mainly $C_{60}$ and smaller amounts of $C_{70}$ and $C_{84}$ carbon molecules, and possibly small amounts of other higher molecular weight fullerenes) in 200 milliliters of ethylene diamine and agitating for 72 hours. An ink composition comprising 2.5 percent by weight of such water soluble fullerenes, 15 percent by weight of ethylene glycol, 0.3 percent by weight of CARBOWAX M20 TM, and 82.2 percent by weight of water is prepared by mixing together the ingredients at room temperature, stirring for about 10 minutes to obtain a homogeneous solution, and filtering. The ink thus prepared is incorporated into a jetting test fixture. It is believed that images of excellent resolution with no substantial background deposits can be obtained.

Other modifications of the present invention may occur to those skilled in the art subsequent to a review of the present application. The aforementioned modifications, including equivalents thereof, are intended to be included within the scope of the present invention.

What is claimed is:

1. An ink composition which comprises an aqueous or organic liquid vehicle, and as a colorant a fullerene, or a mixture of fullerenes.

2. An ink in accordance with claim 1 wherein the liquid vehicle is water.

3. An ink in accordance with claim 1 wherein the organic vehicle is an aromatic component.

4. An ink in accordance with claim 1 wherein the fullerene is present in an amount of from between about 1 and about 20 weight percent.

5. An ink composition according to claim 1 wherein the aqueous liquid vehicle comprises water and a humectant.

6. An ink composition according to claim 5 wherein the humectant is cyclohexyl pyrrolidone.

7. An ink composition according to claim 1 wherein the vehicle is present in an amount of from between about 75 to about 99 percent by weight and the fullerene is present in an amount of from between about 1 to about 15 percent by weight.

8. An ink in accordance with claim 1 wherein the fullerene is comprised of $C_{60}$ carbon.

9. An ink in accordance with claim 1 wherein the fullerene is comprised of $C_{60}$ carbon in the configuration of a soccer ball.

10. An ink in accordance with claim 1 wherein the fullerene is comprised of $C_{60}$ carbon, $C_{70}$ carbon, $C_{84}$ carbon, $C_{234}$ carbon, $C_{340}$ carbon, or mixtures thereof.

11. An ink in accordance with claim 2 wherein the fullerene is comprised of $C_{60}$ carbon, $C_{70}$ carbon, $C_{84}$ carbon, $C_{234}$ carbon, $C_{340}$ carbon, or mixtures thereof.

12. An ink in accordance with claim 2 wherein the fullerene is comprised of $C_{60}$ carbon in the configuration of a soccer ball.

13. An ink in accordance with claim 1 containing a humectant.

14. An ink in accordance with claim 1 containing a biocide.

15. An ink in accordance with claim 1 containing pigment particles.

16. An ink in accordance with claim 1 containing pigment particles comprised of cyan, magenta, yellow, or mixtures thereof.

17. An ink composition comprised of aqueous liquid vehicle, and dispersed therein as a colorant a fullerene.

18. In a printing process in which an ink is ejected in the form of droplets in an imagewise pattern onto a substrate, thereby generating images on the substrate, the improvement comprising incorporating into an ink jet printing apparatus the ink composition of claim 1.

19. In a printing process in accordance with claim 18 wherein the ink jet printing apparatus employs a thermal ink jet printing process.

20. In a printing process in which an ink is ejected in the form of droplets in an imagewise pattern onto a substrate, thereby generating images on the substrate, the improvement comprising incorporating into an ink jet printing apparatus the ink composition of claim 17.

21. An ink composition containing a fullerene or a mixture of fullerenes.

* * * * *

Adverse Decisions In Interference

Patent No. 5,114,477, Joseph Mort, LIQUID INK COMPOSITIONS, Interference No. 103,281, final judgment adverse to the patentees rendered September 23, 1999, as to claims 1 through 20.
*(Official Gazette July 4, 2000)*